(12) United States Patent
Gao

(10) Patent No.: US 11,882,551 B2
(45) Date of Patent: Jan. 23, 2024

(54) DATA UPLOADING METHOD AND APPARATUS OF USER TERMINAL, STORAGE DEVICE, AND USER TERMINAL

(71) Applicant: SPREADTRUM COMMUNICATIONS (SHANGHAI) CO., LTD., Shanghai (CN)

(72) Inventor: Xinghang Gao, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 522 days.

(21) Appl. No.: 17/267,537

(22) PCT Filed: Jul. 19, 2019

(86) PCT No.: PCT/CN2019/096771
§ 371 (c)(1),
(2) Date: Feb. 10, 2021

(87) PCT Pub. No.: WO2020/029768
PCT Pub. Date: Feb. 13, 2020

(65) Prior Publication Data
US 2021/0314947 A1 Oct. 7, 2021

(30) Foreign Application Priority Data
Aug. 10, 2018 (CN) .......................... 201810910105.9

(51) Int. Cl.
*H04W 72/0453* (2023.01)
*H04W 24/08* (2009.01)
*H04B 17/345* (2015.01)

(52) U.S. Cl.
CPC ...... *H04W 72/0453* (2013.01); *H04B 17/345* (2015.01); *H04W 24/08* (2013.01)

(58) Field of Classification Search
CPC .......................... H04W 72/0453; H04W 24/08
(Continued)

(56) References Cited

U.S. PATENT DOCUMENTS 9,497,756 B2    11/2016   Dinan
2012/0281564 A1 11/2012   Zhang et al.
(Continued)

FOREIGN PATENT DOCUMENTS

CN    103201977 A    7/2013
CN    107241164 A    10/2017
(Continued)

OTHER PUBLICATIONS

Huawei et al., "Discussion on the L2 impact from Packet", 3rd Generation Partnership Project, 3GPP TSG-RAN2 Meeting #100; Dated Nov. 27-Dec. 1, 2017; R2-1713791; 6 pages.
(Continued)

*Primary Examiner* — Angel T Brockman
(74) *Attorney, Agent, or Firm* — CANTOR COLBURN LLP

(57) ABSTRACT

A data uploading method and apparatus of a user terminal, a storage device, and a user terminal. The method comprises: by means of a test, determine the measurement value of a transmission quality parameter of each wireless data link of each RB that is configured with a PDCP duplication function; according to the comparison result of the measurement value of the transmission quality parameter of each wireless data link and a preset parameter threshold value, determine whether the wireless data link is a wireless data link to be used; and according to the number of wireless data links to be used, a PDCP entity duplicates a PDCP data packet, and transmits the PDCP data packet by means of the wireless data link to be used. The solution of the present invention is helpful for reducing signaling overhead, improving trans-
(Continued)

S31 — determining a measured value of a transmission quality parameter of each leg of each RB configured with a PDCP duplication function through a testing S32 — according to a comparison result of the measured value of the transmission quality parameter of each leg with a corresponding preset parameter threshold, determining whether each leg is a to-be-used leg S33 — sending duplicated PDCP data packets through the to-be-used legs, wherein the duplicated PDCP data packets are generated by a PDCP entity duplicating a PDCP data packet according to a number of to-be-used legs mission quality, and improving the utilization rate of a transmission resource.

11 Claims, 5 Drawing Sheets

(58) Field of Classification Search
USPC .......................................................... 370/329
See application file for complete search history.

(56) References Cited

U.S. PATENT DOCUMENTS

| | | |
|---|---|---|
| 2018/0279168 A1 | 9/2018 | Jheng et al. |
| 2018/0368132 A1 | 12/2018 | Babaei et al. |
| 2019/0327639 A1 | 10/2019 | Huang et al. |
| 2020/0145171 A1 | 5/2020 | Jiang |
| 2020/0245330 A1 | 7/2020 | Jiang |

FOREIGN PATENT DOCUMENTS

| | | | |
|---|---|---|---|
| CN | 107438976 A | 12/2017 | |
| CN | 108270516 A | 7/2018 | |
| CN | 108282248 A | 7/2018 | |
| CN | 108353408 A | 7/2018 | |
| CN | 108370304 A | 8/2018 | |
| KR | 20150090804 A | 8/2015 | |
| WO | 2014031989 A1 | 2/2014 | |
| WO | 2017032039 A1 | 3/2017 | |
| WO | 2018143600 A1 | 8/2018 | |
| WO | 2018171734 A1 | 9/2018 | |
| WO | WO-2018200584 A1 * | 11/2018 | ............... H04L 1/08 |
| WO | 2018231425 A1 | 12/2018 | |

OTHER PUBLICATIONS

Huawei et al., "PBR configuration for duplication DRB", 3rd Generation Partnership Project, 3GPP TSG-RAN2 Meeting #100; Dated Feb. 26-Mar. 2, 2018; R2-1801939; 4 pages.

International Search Report for International Application No. PCT/CN2019/096771; dated Oct. 10, 2019.

Nokia et al., "PDCP data duplication in LTE", 3rd Generation Partnership Project, 3GPP TSG-RAN WG2 #99bis; Dated Oct. 9-13, 2017; R2-1711001; 6 pages.

Oppo, "Control on UL packet duplication for DC duplication", 3rd Generation Partnership Project, 3GPP TSG-RAN2 Meeting AH#1; Dated Jan. 22-26, 2018; R2-1800153; 6 pages.

Sharp, "PDCP Duplication in CA"; 3rd Generation Partnership Project, 3GPP TSG-RAN2 Adhoc Meeting; Dated Jun. 27-29, 2017; R2-1706791; 6 pages.

EPO Extended European Search Report for corresponding EP Application No. 19847939.6; dated Mar. 21, 2022.

IPIN First Office Action for corresponding IN Application No. 202117009439; dated Jan. 27, 2022.

Interdigital Communications, "Package Duplication at PDCP", 3GPP TSG-RAN WG2 Meeting #97; R2-1701186; Feb. 13-17, 2017; 2 pages.

* cited by examiner

DATA UPLOADING METHOD AND APPARATUS OF USER TERMINAL, STORAGE DEVICE, AND USER TERMINAL

CROSS REFERENCE TO RELATED APPLICATIONS

This is the U.S. national stage of application No. PCT/CN2019/096771, filed on Jul. 1, 2019. Priority under 35 § 119(a) and 35 U.S.C. § 365(b) is claimed from Chinese Application No. 201810910105.9, filed Aug. 10, 2018, the disclosure of which is also incorporated herein by reference.

TECHNICAL FIELD

The present disclosure generally relates to communication technology field, and more particularly, to a data uploading method and apparatus of a user terminal, a storage device and a user terminal.

BACKGROUND

With the development of wireless communication technology, 3GPP has introduced New Radio (NR) access technology to meet the demand of larger data volume and smaller transmission delay. This technology is also known as the fifth-generation mobile communication technology (5G).

In 5G, two new technologies are introduced: Packet Data Convergence Protocol (PDCP) duplication function and Band Width Part (BWP).

Specifically, the PDCP replication function is introduced to improve the reliability of Ultra Reliable Low Latency Communication (URLLC) service transmission. More specifically, a PDCP data packet is duplicated into two same duplicates at a PDCP layer of a sending end, where the two same duplicates are sent to two different Radio Link Control (RLC) entities respectively, and then sent through different sending end Logical Channels (LCH). When the two duplicates are successfully received, a PDCP layer at a receiving end keeps one of them and deletes the other one. In other words, a data packet is duplicated into two same duplicates and transmitted through two different channels, thereby improving the reliability of data transmission. And the PDCP data packet may include a PDCP Protocol Data Unit (PDU) and a PDCP Service Data Unit (SDU).

However, in prior art, how many and which sending end logical channels to be used will be used to send duplicated PDCP data packets are instructed by the network side for the UE through signaling, resulting in large signaling overhead in order to achieve more flexible activation/deactivation control.

SUMMARY

Embodiments of the present disclosure provide a data uploading method and apparatus of a user terminal, a storage device and a user terminal, which facilitate to reduce signaling overhead, improve transmission quality and utilization rate of transmission resources.

In an embodiment of the present disclosure, a data uploading method of a user terminal is provided, including: determining a measured value of a transmission quality parameter of each leg of each Radio Bearer (RB) configured with a Packet Data Convergence Protocol (PDCP) duplication function through a testing; according to a comparison result of the measured value of the transmission quality parameter of each leg with a corresponding preset parameter threshold, determining whether each leg is a to-be-used leg; and sending duplicated PDCP data packets through the to-be-used legs, wherein the duplicated PDCP data packets are generated by a PDCP entity duplicating a PDCP data packet according to a number of to-be-used legs.

Optionally, the transmission quality parameter includes at least one of an amount of data successfully transmitted per unit time and a channel interference noise; wherein the amount of data successfully transmitted per unit time corresponds to a preset data amount threshold, and the channel interference noise corresponds to a preset noise threshold.

Optionally, according to a comparison result of the measured value of the transmission quality parameter of each leg with a corresponding preset parameter threshold, determining whether each leg is a to-be-used leg includes: if the amount of data successfully transmitted per unit time on a certain leg is greater than or equal to the preset data amount threshold and/or the channel interference noise of the certain leg is less than or equal to the preset noise threshold, determining the certain leg to be a to-be-used leg.

Optionally, preset parameter thresholds set for different RBs are the same or different.

Optionally, preset parameter thresholds set for different legs are the same or different.

In an embodiment of the present disclosure, a data uploading apparatus of a user terminal is provided, including: a parameter determination module, adapted to determine a measured value of a transmission quality parameter of each leg of each Radio Bearer (RB) configured with a Packet Data Convergence Protocol (PDCP) duplication function through a testing; a leg determination module, adapted to, according to a comparison result of the measured value of the transmission quality parameter of each leg with a corresponding preset parameter threshold, determine whether each leg is a to-be-used leg; and a sending module, adapted to send duplicated PDCP data packets through the to-be-used legs, wherein the duplicated PDCP data packets are generated by a PDCP entity duplicating a PDCP data packet according to a number of to-be-used legs.

Optionally, the transmission quality parameter includes at least one of an amount of data successfully transmitted per unit time and a channel interference noise; wherein the amount of data successfully transmitted per unit time corresponds to a preset data amount threshold, and the channel interference noise corresponds to a preset noise threshold.

Optionally, the leg determination module includes: a leg determination sub-module, adapted to, if the amount of data successfully transmitted per unit time on a certain leg is greater than or equal to the preset data amount threshold and/or the channel interference noise of the certain leg is less than or equal to the preset noise threshold, determine the certain leg is a to-be-used leg.

Optionally, preset parameter thresholds set for different RBs are the same or different.

Optionally, preset parameter thresholds set for different legs are the same or different.

In an embodiment of the present disclosure, a storage medium having computer instructions stored therein is provided, wherein once the computer instructions are executed, the above data uploading method of a user terminal is performed.

In an embodiment of the present disclosure, a user terminal including a memory and a processor is provided, wherein the memory has computer instructions stored therein, and when the processor executes the computer instructions, the above data uploading method of a user terminal is performed.

Embodiments of the present disclosure may provide following advantages.

In embodiments of the present disclosure, a measured value of a transmission quality parameter of each leg of each RB configured with a PDCP duplication function is determined through a testing; according to a comparison result of the measured value of the transmission quality parameter of each leg with a corresponding preset parameter threshold, whether each leg is a to-be-used leg is determined; and duplicated PDCP data packets are sent through the to-be-used legs, wherein the duplicated PDCP data packets are generated by a PDCP entity duplicating a PDCP data packet according to a number of to-be-used legs. According to the embodiments of the present disclosure, according to the comparison result of the measured value of the transmission quality parameter of each leg with the corresponding preset parameter threshold, whether each leg is a to-be-used leg is determined. However, in the prior art, the network side is required to send an activation instruction to notify the user terminal of the legs to be used. Therefore, according to the embodiments, in addition to reducing signaling overhead, the user terminal can select a leg with better transmission quality for uplink data transmission, which facilitates to improve transmission quality and utilization efficiency of transmission resources.

Further, preset parameter thresholds set for different RBs may be the same or different, and legs with higher or lower transmission quality may be selected according to requirements of different RBs, which helps to improve selection flexibility, thereby improving utilization efficiency of transmission resources.

Further, preset parameter thresholds set for different legs may be the same or different. According to the embodiments, legs with higher or lower transmission quality may be selected according to different transmission requirements. Even in a same RB, legs with different transmission quality may be selected to transmit data, which facilitates to further improve selection flexibility and utilization efficiency of transmission resources.

DETAILED DESCRIPTION

In prior art, activation/deactivation mechanism of two-leg duplication mode is supported. Specifically, for each Radio Bearer (RB) configured with duplication function, a bit is used to indicate activation or deactivation of the duplication function of the RB. The activation of the duplication function can be used to instruct a PDCP to perform duplication operation and both two legs can be used for data transmission; the deactivation of the duplication function can be used to instruct the PDCP not to perform duplication operation and only a primary leg can be used for data transmission.

However, for multi-connectivity duplication, an RB configured with duplication function may be configured with more than two wireless data legs. For each RB, it is not clear to use only one bit to indicate how many sending end logical channels to be used are used to send duplicated PDCP data packets, and which sending end logical channels to be used are used for data transmission. Specifically, one bit only includes two states of 0/1, that is, it can only be used to indicate two logical channels, and cannot clearly indicate the use of multi-connectivity duplication.

Figure 1:
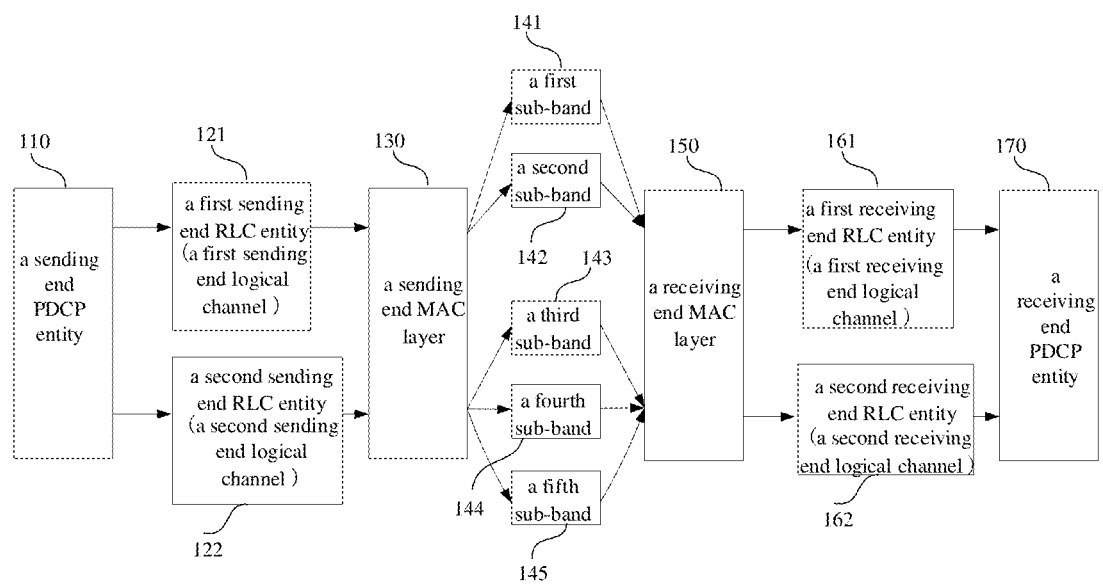
FIG. 1 schematically illustrates a working scenario diagram of a data sending method in prior art.

Referring to FIG. 1, FIG. 1 schematically illustrate a working scenario diagram of a data sending method in prior art. The data sending method may be used in a PDCP duplication function architecture in a Carrier Aggregation (CA) scenario.

In the data sending method, a sending end PDCP entity 110 sends PDCP data packets to a first sending end RLC entity 121 and a second sending end RLC entity 122 respectively, and the PDCP data packets are sent to a sending end Medium Access Control (MAC) layer 130 through a first sending end logical channel corresponding to the first sending end RLC entity 121 and a second sending end logical channel corresponding to the second sending end RLC entity 122 respectively.

Since the first sending end logical channel and the second sending end logical channel are respectively mapped to different sub-bands, the PDCP data packets will be sent through different sub-bands respectively. For example, a PDCP data packet sent by the first sending end logical channel will be sent through a first sub-band 141 and a second sub-band 142, and a PDCP data packet sent by the second sending end logical channel will be sent through a third sub-band 143, a fourth sub-band 144 and a fifth sub-band 145.

Further, a receiving end MAC layer 150 receives the PDCP data packets through different sub-bands, such as the first sub-band 141, the second sub-band 142, the third sub-band 143, the fourth sub-band 144 and the fifth sub-band 145, respectively. And the PDCP data packets will be uploaded to a first receiving end RLC entity 161 and a second receiving end RLC entity 162 correspondingly, and then be uploaded to a receiving end PDCP entity 170 the through a first receiving end logical channel corresponding to the first receiving end RLC entity 161 and a second receiving end logical channel corresponding to the second receiving end RLC entity 162.

Specifically, each leg may be a path from the sending end PDCP entity 110 to the receiving end PDCP entity 170, for example, from a sending end PDCP entity, a sending end RLC entity, a sending end MAC layer, a sub-band, a receiving end MSC layer, a receiving end RLC entity, to a receiving end PDCP entity.

In the existing PDCP duplication function architecture in the CA scenario, a plurality of steps, such as configuration, activation and deactivation may be performed to realize the duplication function.

Specifically, in the configuration step, a network side (for example, a base station) may use a Radio Resource Control (RRC) message to configure PDCP duplication function for multiple RBs, and establish an additional duplication RLC entity for each RB; wherein the RRC message may also indicate a sub-band Cell group ID and a Logic Channel ID (LCID) of a main RLC entity. The RRC message may also set a duplication initial state for the RBs (for example, activation/deactivation).

In the CA scenario, usually only one MAC entity is needed. Through the RRC message, the two RLC entities are also configured to be mapped to different carriers respectively.

Furthermore, after the configuration step is completed, the activation step is needed to perform the duplication function. The activation/deactivation step is performed by sending an activation/deactivation MAC control element (CE) from the network side. The MAC CE includes a bitmap, where each bit of the bitmap corresponds to a RB configured with duplication. Specifically, if a certain bit corresponding to a certain RB is configured with 1, it indicates to activate duplication for the certain RB; and if a certain bit corresponding to a certain RB is configured with 0, it indicates to deactivate duplication for the certain RB.

The RB may include a Data Radio Bearer (DRB) and a Signaling Radio Bearer (SRB).

In the activation step, after a certain RB configured with duplication is activated, the PDCP layer duplicates the data packet and sends the two same duplicated PDCP Protocol Data Units (PDUs) to two RLC entities corresponding to the same RB respectively, and the two RLC entities will send the two same duplicated PDCP PDUs respectively.

In the deactivation step, after a certain RB configured with duplication is deactivated, a corresponding restriction between a corresponding logical channel (LCH) and a carrier is cancelled; the sending end PDCP layer will not duplicate new data packets. The new data packets will be sent to a primary RLC entity (ie, a primary LCH), and not to a secondary RLC entity (ie, a secondary LCH). In addition, the sending end PDCP entity will notify the secondary RLC entity to cancel data stored in the secondary LCH.

Figure 2:
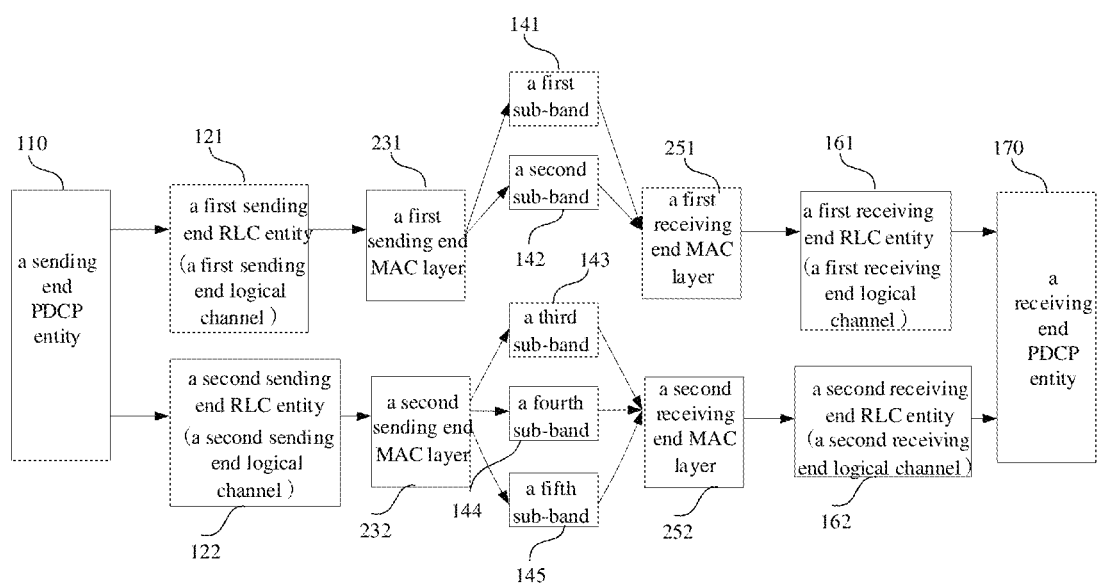
FIG. 2 schematically illustrates another working scenario diagram of a data sending method in prior art.

Referring to FIG. 2, FIG. 2 schematically illustrate another working scenario diagram of a data sending method in prior art. The data sending method can be used in a PDCP duplication function architecture in a Dual Connectivity (DC) scenario.

Referring to FIG. 2, multiple sending end MAC layers and multiple receiving end MAC layers are provided. For example, the multiple sending end MAC layers include a first sending end MAC layer 231 and a second sending end MAC layer 232; the multiple receiving end MAC layers include a first receiving end MAC layer 251 and a second receiving end MAC layer 252.

In some embodiments, each leg is a path from a sending end PDCP entity 110 to a receiving end PDCP entity 170, for example, from a sending end PDCP entity, a sending end RLC entity, a sending end MAC layer, a sub-band, a receiving end MAC layer, a receiving end RLC entity to a receiving end PDCP entity. Specifically, the multiple sending end MAC layers correspond to the multiple sending end RLC entities, and the multiple receiving end MAC layers correspond to the multiple receiving end RLC entities.

In the existing PDCP duplication function architecture in the DC scenario, a plurality of steps, such as configuration, activation and deactivation may be performed to realize the duplication function.

In some embodiments, the configuration step may be similar to that in the CA scenario.

Furthermore, after the configuration step is completed, the activation step is needed to perform the duplication function. The activation/deactivation step is performed by sending an activation/deactivation MAC CE from the network side. The MAC CE includes a bitmap, where each bit of the bitmap corresponds to a RB configured with duplication. Specifically, if a certain bit corresponding to a certain RB is configured with 1, it indicates to activate duplication for the certain RB; and if a certain bit corresponding to a certain RB is configured with 0, it indicates to deactivate duplication for the certain RB.

In the activation step, after a certain RB configured with duplication is activated, the PDCP layer duplicates the data packet and sends the two same duplicated PDCP Protocol Data Units (PDUs) to two RLC entities corresponding to the same RB respectively, and the two RLC entities will send the two same duplicated PDCP PDUs respectively.

In the deactivation step, after a certain RB configured with duplication is deactivated, the UE falls back to a split operation and adopts a relevant configuration of the split operation.

However, in the prior art, in order to achieve more flexible activation/deactivation control, large signaling overhead will be generated.

Inventors of the present disclosure found that, how many and which sending end logical channels to be used will be used to send duplicated PDCP data packets are instructed by the network side for the UE through signaling, which may result in two following problems:
1. A number of RBs configured with duplication function and a number of configurable legs in each RB are large, resulting in large overhead of activation signaling;
2. An activation state of each leg may be adjusted according to transmission quality, resulting in too frequent transmission of activation signaling.

In other words, in order to adjust the activation state of each leg flexibly according to the channel transmission situation, there would be larger signaling overhead; however, in order to reduce signaling overhead, more flexible activation/deactivation control cannot be achieved.

In embodiments of the present disclosure, a measured value of a transmission quality parameter of each leg of each RB configured with a PDCP duplication function is determined through a testing; according to a comparison result of the measured value of the transmission quality parameter of each leg with a corresponding preset parameter threshold, whether each leg is a to-be-used leg is determined; and duplicated PDCP data packets are sent through the to-be-used legs, wherein the duplicated PDCP data packets are generated by a PDCP entity duplicating a PDCP data packet according to a number of to-be-used legs. According to the embodiments of the present disclosure, according to the comparison result of the measured value of the transmission quality parameter of each leg with the corresponding preset parameter threshold, whether each leg is a to-be-used leg is determined. However, in the prior art, the network side is required to send an activation instruction to notify the user terminal of the legs to be used. Therefore, according to the embodiments, in addition to reducing signaling overhead, the user terminal can select a leg with better transmission quality for uplink data transmission, which facilitates to improve transmission quality and utilization efficiency of transmission resources.

In order to clarify the object, characteristic and advantages of embodiments of the present disclosure, embodiments of present disclosure will be described clearly in detail in conjunction with accompanying drawings.

Figure 3:
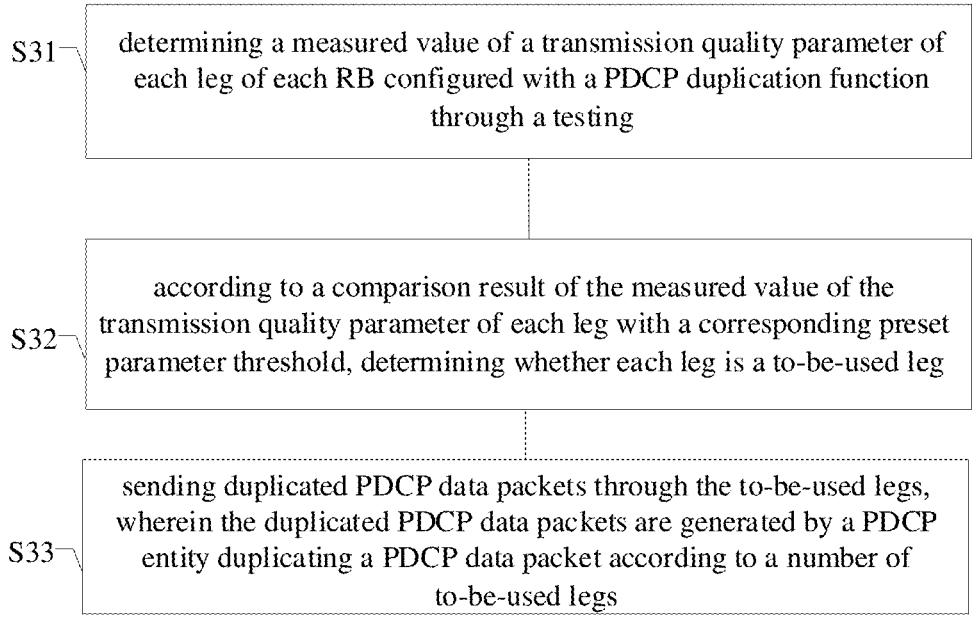
FIG. 3 schematically illustrates a data uploading method of a user terminal according to an embodiment.

Referring to FIG. 3, FIG. 3 schematically illustrates a data uploading method of a user terminal according to an embodiment. The data uploading method of a user terminal includes S31 to S33.

In S31, a measured value of a transmission quality parameter of each leg of each RB configured with a PDCP duplication function is determined through a testing.

In S32, according to a comparison result of the measured value of the transmission quality parameter of each leg with a corresponding preset parameter threshold, whether each leg is a to-be-used leg is determined.

In S33, duplicated PDCP data packets are sent through the to-be-used legs, wherein the duplicated PDCP data packets are generated by a PDCP entity duplicating a PDCP data packet according to a number of to-be-used legs.

In S31, the transmission quality parameter may be used to indicate the transmission quality of each leg of each RB configured with the PDCP duplication function.

In some embodiments, the transmission quality parameter includes at least one of an amount of data successfully transmitted per unit time and a channel interference noise.

Specifically, in the test, a preset amount of data may be sent, and the amount of data successfully transmitted per unit time may be calculated. The transmission quality of the leg may be determined according to a comparison result between the amount of data successfully transmitted per unit time and the preset amount of data.

Specifically, the greater the amount of data successfully transmitted per unit time, the better the transmission quality parameter can be considered.

In some embodiments, the channel interference noise usually includes frequency detection of interference signals, which may include direct frequency measurement in a frequency domain, for example, a frequency measurement algorithm using a search frequency window and an adjacent frequency window. In other embodiments, frequency detection of interference signals may not include direct frequency measurement in the frequency domain, for example, correlation convolution and Fourier transform algorithm.

Specifically, the smaller the channel interference noise, the better the transmission quality parameter can be considered.

It should be noted that in embodiments of the present invention, how to calculate the amount of data successfully transmitted per unit time and how to detect the channel interference noise are not specifically limited.

In some embodiments, the amount of data successfully transmitted per unit time corresponds to a preset data amount threshold, and the channel interference noise corresponds to a preset noise threshold.

In some embodiments, according to a comparison result of the measured value of the transmission quality parameter of each leg with a corresponding preset parameter threshold, determining whether each leg is a to-be-used leg includes: if the amount of data successfully transmitted per unit time on a certain leg is greater than or equal to the preset data amount threshold, determining the certain leg to be a to-be-used leg.

Specifically, the preset data amount threshold may be determined according to specific conditions. For example, when legs with higher transmission quality need to be selected, the preset data amount threshold may be increased, and a number of determined to-be-used legs may decrease accordingly. Conversely, when legs with lower transmission quality need to be selected, the preset data amount threshold may be decreased, and a number of determined to-be-used legs may increase accordingly.

According to the embodiments of the present disclosure, if the amount of data successfully transmitted per unit time on a certain leg is greater than or equal to the preset data amount threshold, the certain leg is determined to be a to-be-used leg, which enables the user terminal to select legs with better transmission quality for uplink data transmission according to the amount of data successfully transmitted per unit time, thereby improving transmission quality and utilization efficiency of transmission resources.

In some embodiments, according to a comparison result of the measured value of the transmission quality parameter of each leg with a corresponding preset parameter threshold, determining whether each leg is a to-be-used leg includes: if the channel interference noise on a certain leg is less than or equal to the preset noise threshold, determining the certain leg to be a to-be-used leg.

Specifically, the preset noise t threshold may be determined according to specific conditions. For example, when legs with higher transmission quality need to be selected, the preset noise threshold may be decreased, and a number of determined to-be-used legs may decrease accordingly. Conversely, when legs with lower transmission quality need to be selected, the preset noise threshold may be increased, and a number of determined to-be-used legs may increase accordingly.

According to the embodiments of the present disclosure, if the channel interference noise on a certain leg is less than or equal to the preset noise threshold, the certain leg is determined to be a to-be-used leg, which enables the user terminal to select legs with better transmission quality for uplink data transmission according to the channel interference noise, thereby improving transmission quality and utilization efficiency of transmission resources.

In S33, according to the number of to-be-used legs, a PDCP entity duplicates a PDCP data packet to generate duplicated PDCP data packets, and the duplicated PDCP data packets are sent through the to-be-used legs.

In some embodiments, the PDCP entity receives a data packet from an upper layer and duplicates the data packet at the PDCP entity's layer. Specifically, according to the number of to-be-used legs N, the PDCP entity duplicates the PDCP data packet (N−1) times to obtain a total number of PDCP data packets as N, and then sends the N PDCP data packets through the N to-be-used legs.

In the embodiments of the present disclosure, according to the comparison result of the measured value of the transmission quality parameter of each leg with the corresponding preset parameter threshold, whether each leg is a to-be-used leg is determined. However, in the prior art, the network side is required to send an activation instruction to notify the user terminal of the legs to be used. Therefore, according to the embodiments, in addition to reducing signaling overhead, the user terminal can select a leg with better transmission quality for uplink data transmission, which facilitates to improve transmission quality and utilization efficiency of transmission resources.

Figure 4:
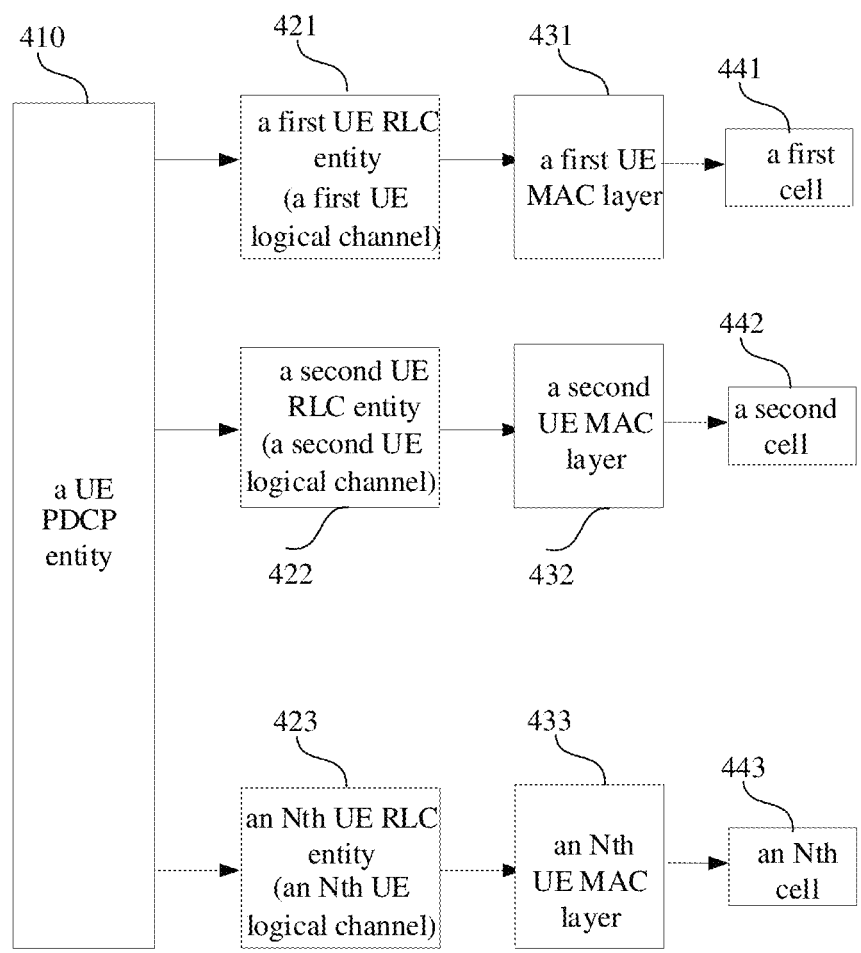
FIG. 4 schematically illustrates a working scenario diagram of a data uploading method of a user terminal according to an embodiment.

Referring to FIG. 4, FIG. 4 schematically illustrates a working scenario diagram of a data uploading method of a user terminal according to an embodiment. The data uploading method may apply to a PDCP duplication function architecture in a DC scenario.

Referring to FIG. 4, a UE PDCP entity 410 uploads PDCP data packets to a first UE RLC entity 421, a second UE RLC entity 422, . . . and an Nth UE RLC entity 423, respectively; and then the PDCP data packets are sent to a first UE MAC layer 431 through a first UE logical channel corresponding to the first UE RLC entity 421, to a second UE MAC layer 432 through a second UE logical channel corresponding to the second UE RLC entity 422, . . . and to an Nth UE MAC layer 433 through an Nth UE logical channel corresponding to the Nth UE RLC entity 423, respectively.

Further, the PDCP data packets will be sent through different cells respectively. For example, a PDCP data packet sent by the first UE logical channel is uploaded through a first cell 441, and a PDCP data packet sent by the second UE logical channel is uploaded through a second cell 442, . . . and a PDCP data packet sent by the Nth UE logical channel is uploaded through an Nth cell 443.

In some embodiments, preset parameter thresholds set for different RBs are the same or different.

Specifically, all legs of all RBs configured with the duplication function may be set to use a same preset parameter threshold. For example, a UE has three RBs configured with the duplication function, and legs (including logical channels) configured by each RB are shown in FIG. 4, then the first leg to the Nth leg use the same preset parameter threshold.

Specifically, the same preset parameter threshold may be predefined, for example, predefined by an agreement, which cannot be changed.

In some embodiments, the same preset parameter threshold may also be sent by the network side (for example, a base station) to the UE, and the preset parameter threshold may be changed subsequently through reconfiguration. For example, RRC/MAC/PYH messages may be used for reconfiguration.

In some embodiments, the preset parameter thresholds configured for legs corresponding to different RBs may be set to be the same or different. Taking N=12 as an example, Legs 1 to 3 may be set to share one (or one group of) preset parameter threshold, that is, LCH1~LCH3 share one (or one group of) threshold; Legs 4 to 7 share one (or one group of) preset parameter threshold, that is, LCH4~LCH7 share one (or one group of) threshold; Legs 8 to 12 share one (or one group of) preset parameter threshold, that is, LCH8~LCH12 share one (or one group of) preset parameter threshold. The three (or three groups of) thresholds may be the same or different.

In the embodiments of the present disclosure, the preset parameter thresholds set for different RBs may be the same or different, and legs with higher or lower transmission quality may be selected according to requirements of different RBs, which helps to improve selection flexibility, thereby improving utilization efficiency of transmission resources.

In some embodiments, preset parameter thresholds set for different legs are the same or different.

Specifically, each leg used for duplication may use a different (or a different group of) preset parameter threshold, and preset parameter thresholds used by different legs may be the same or different. For example: each of Legs 1 to 12 uses a different (or a different group of) preset parameter threshold, that is, each of LCH1 to LCH12 uses a different (or a different group of) preset parameter threshold.

In the embodiments of the present disclosure, the preset parameter thresholds set for different legs are the same or different. According to the embodiments, legs with higher or lower transmission quality may be selected according to different transmission requirements. Even in a same RB, legs with different transmission quality may be selected to transmit data, which facilitates to further improve selection flexibility and utilization efficiency of transmission resources.

It should be noted that in a CA scenario, preset parameter thresholds set for different RBs may also be set to be the same or different, and the preset parameter thresholds set for different legs may also be set to be the same or different. Principles, detailed implementation and advantages of the preset parameter thresholds set in the CA scenario can be found in the above descriptions of the DC scenario, and are not described here.

Figure 5:
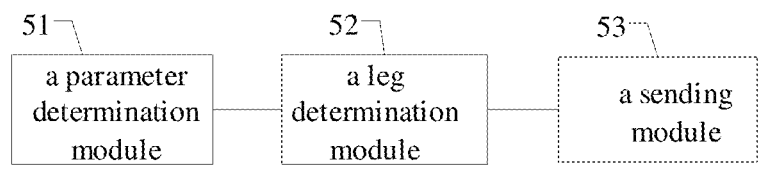
FIG. 5 is a structural diagram of a data uploading apparatus of a user terminal according to an embodiment.

Referring to FIG. 5, FIG. 5 is a structural diagram of a data uploading apparatus of a user terminal according to an embodiment. The data uploading apparatus of a user terminal includes:
- a parameter determination module 51, adapted to determine a measured value of a transmission quality parameter of each leg of each RB configured with a PDCP duplication function through a testing;
- a leg determination module 52, adapted to, according to a comparison result of the measured value of the transmission quality parameter of each leg with a corresponding preset parameter threshold, determine whether each leg is a to-be-used leg; and
- a sending module 53, adapted to send duplicated PDCP data packets through the to-be-used legs, wherein the duplicated PDCP data packets are generated by a PDCP entity duplicating a PDCP data packet according to a number of to-be-used legs.

In some embodiments, the transmission quality parameter includes at least one of an amount of data successfully transmitted per unit time and a channel interference noise; wherein the amount of data successfully transmitted per unit time corresponds to a preset data amount threshold, and the channel interference noise corresponds to a preset noise threshold.

In some embodiments, the leg determination module 52 includes: a leg determination sub-module (not shown in the figure), adapted to, if the amount of data successfully transmitted per unit time on a certain leg is greater than or equal to the preset data amount threshold and/or the channel interference noise of the certain leg is less than or equal to the preset noise threshold, determine the certain leg is a to-be-used leg.

In some embodiments, preset parameter thresholds set for different RBs are the same or different.

In some embodiments, preset parameter thresholds set for different legs are the same or different.

Principles, detailed implementation and advantages of the data uploading apparatus of a user terminal can be found in the above descriptions of the method as shown in FIG. 3, and are not described here.

In an embodiment of the present disclosure, a storage medium having computer instructions stored therein is provided, wherein once the computer instructions are executed, the above data uploading method of a user terminal as shown in FIG. 3 is performed. The storage medium may include a Read Only Memory (ROM), a Random Access Memory (RAM), a magnetic disk, an optical disk or the like. Alternatively, the storage medium may include a non-volatile or non-transitory memory or the like.

In an embodiment of the present disclosure, a user terminal including a memory and a processor is provided, wherein the memory has computer instructions stored therein, and when the processor executes the computer instructions, the above data uploading method of a user terminal as shown in FIG. 3 is performed. The user equipment may include but not limited to a mobile phone, a computer or a tablet computer.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A data uploading method of a user terminal, comprising:

determining a measured value of a transmission quality parameter of each leg of each Radio Bearer (RB) configured with a Packet Data Convergence Protocol (PDCP) duplication function through a testing;

according to a comparison result of the measured value of the transmission quality parameter of each leg with a corresponding preset parameter threshold, determining whether each leg is a to-be-used leg; and sending duplicated PDCP data packets through the to-be-used legs, wherein the duplicated PDCP data packets are generated by a PDCP entity duplicating a PDCP data packet according to a number of to-be-used legs.

2. The data uploading method of a user terminal according to claim 1, wherein the transmission quality parameter comprises at least one of an amount of data successfully transmitted per unit time and a channel interference noise;

wherein the amount of data successfully transmitted per unit time corresponds to a preset data amount threshold, and the channel interference noise corresponds to a preset noise threshold.

3. The data uploading method of a user terminal according to claim 2, wherein according to a comparison result of the measured value of the transmission quality parameter of each leg with a corresponding preset parameter threshold, determining whether each leg is a to-be-used leg comprises:

if the amount of data successfully transmitted per unit time on a certain leg is greater than or equal to the preset data amount threshold and/or the channel interference noise of the certain leg is less than or equal to the preset noise threshold, determining the certain leg to be a to-be-used leg.

4. The data uploading method of a user terminal according to claim 1, wherein preset parameter thresholds set for different RBs are the same or different.

5. The data uploading method of a user terminal according to claim 1, wherein preset parameter thresholds set for different legs are the same or different.

6. A data uploading apparatus of a user terminal, comprising:

a parameter determination module, adapted to determine a measured value of a transmission quality parameter of each leg of each Radio Bearer (RB) configured with a Packet Data Convergence Protocol (PDCP) duplication function through a testing;

a leg determination module, adapted to, according to a comparison result of the measured value of the transmission quality parameter of each leg with a corresponding preset parameter threshold, determine whether each leg is a to-be-used leg; and a sending module, adapted to send duplicated PDCP data packets through the to-be-used legs, wherein the duplicated PDCP data packets are generated by a PDCP entity duplicating a PDCP data packet according to a number of to-be-used legs.

7. The data uploading apparatus of a user terminal according to claim 6, wherein the transmission quality parameter comprises at least one of an amount of data successfully transmitted per unit time and a channel interference noise;

wherein the amount of data successfully transmitted per unit time corresponds to a preset data amount threshold, and the channel interference noise corresponds to a preset noise threshold.

8. The data uploading apparatus of a user terminal according to claim 7, wherein the leg determination module comprises:

a leg determination sub-module, adapted to, if the amount of data successfully transmitted per unit time on a certain leg is greater than or equal to the preset data amount threshold and/or the channel interference noise of the certain leg is less than or equal to the preset noise threshold, determine the certain leg to be a to-be-used leg.

9. The data uploading apparatus of a user terminal according to claim 6, wherein preset parameter thresholds set for different RBs are the same or different.

10. The data uploading apparatus of a user terminal according to claim 6, wherein preset parameter thresholds set for different legs are the same or different.

11. A storage medium having computer instructions stored therein, wherein once the computer instructions are executed, the method according to claim 1 is performed.

* * * * *